March 11, 1952 R. C. CARLSON 2,588,616

ADJUSTABLE PHONOGRAPH PICKUP ARM

Filed Oct. 29, 1948 2 SHEETS—SHEET 1

INVENTOR.

Reuben C. Carlson

BY J. W. Douglas

Att'y.

March 11, 1952 R. C. CARLSON 2,588,616

ADJUSTABLE PHONOGRAPH PICKUP ARM

Filed Oct. 29, 1948 2 SHEETS—SHEET 2

INVENTOR.
Reuben C. Carlson
BY
J. D. Douglas
Att'y.

Patented Mar. 11, 1952 2,588,616

UNITED STATES PATENT OFFICE 2,588,616

ADJUSTABLE PHONOGRAPH PICKUP ARM

Reuben C. Carlson, Chicago, Ill.

Application October 29, 1948, Serial No. 57,369

10 Claims. (Cl. 274—23)

This invention relates to phonograph pickup apparatus, and particularly to a pickup arm capacitated to reproduce two classes of records, the respective classes differing from each other principally in the size and pitch of their sound grooves and the speed at which they are commonly rotated when reproduced; additionally, the invention comprehends novel control means in connection with the pickup arm, by which it is adapted to be alternately capacitated for operative engagement with the two classes of records.

Although no difficulty is experienced in reproducing, by equipment of known construction, conventional phonograph records, i. e., records which are adapted to be rotated at a speed of 78.26 R. P. M. while engaged by a needle having a radius at the tip thereof of .003 or .004 of an inch when the needle is pressed against the records with a pressure of from 20 to 30 grams, it is impossible to reproduce by this equipment records of the slow speed variety, i. e., fine groove records known to the trade as "micro-groove records," which can be effectively reproduced only by a needle having at the point thereof a radius of about .001 of an inch and held in engagement with the sound groove with a pressure of 5 or 6 grams while the records are rotated at a speed of 33⅓ R. P. M. Nor is it possible to operatively engage a conventional sound grooved record by a needle capacitated for engagement with a microgroove record, especially when the conventional record is rotated at 33⅓ R. P. M. Therefore, to capacitate a record player for reproduction of both kinds of records, record players have been made with two pickup arms, one adapted to operatively engage microgroove records and the other pickup arm adapted to operatively engage the conventional records. This, of course, involves additional machine parts thereby adding to the cost of manufacture of the record player.

Due to the present invention, I am able to reproduce both conventional and microgroove records by the agency of but one pickup arm. I therefore derive the advantages of two pickup arms together with the simplicity of operation of a single pickup arm machine, and with a consequent material saving in the cost of manufacture of a record player in which my invention is incorporated.

In order that the foregoing advantages may be realized, I provide a pickup arm with a transducer having a pair of needles extending therefrom. One of the needles is adapted to engage a fine groove, long playing or microgroove record which is adapted to be reproduced while rotated at a speed of 33⅓ R. P. M. The other of the two needles is adapted to engage the common or coarse grooved variety of record which is adapted to be reproduced while rotated at a speed of 78.26 R. P. M. and which will be referred to hereinafter as a "conventional record." The tips of the needles extend to different planes parallel to the lower side of the pickup arm and are severally swung into a position for engagement with one of the records by swinging the outer end, i. e., the pivoted end, of the pickup arm upwardly or downwardly with respect to its pivotal support while at one and the same time the swinging of the pickup arm is accompanied by shifting of the center of gravity thereof with respect to its horizontal pivotal axis, so that thereby one of the needles is also adapted to engage a record of one class with pressure differing from the pressure with which the other needle is adapted to press against a record of the other class.

Other advantages of the invention will be apparent from the following specification when considered in conjunction with accompanying drawings in which.

Figure 1:
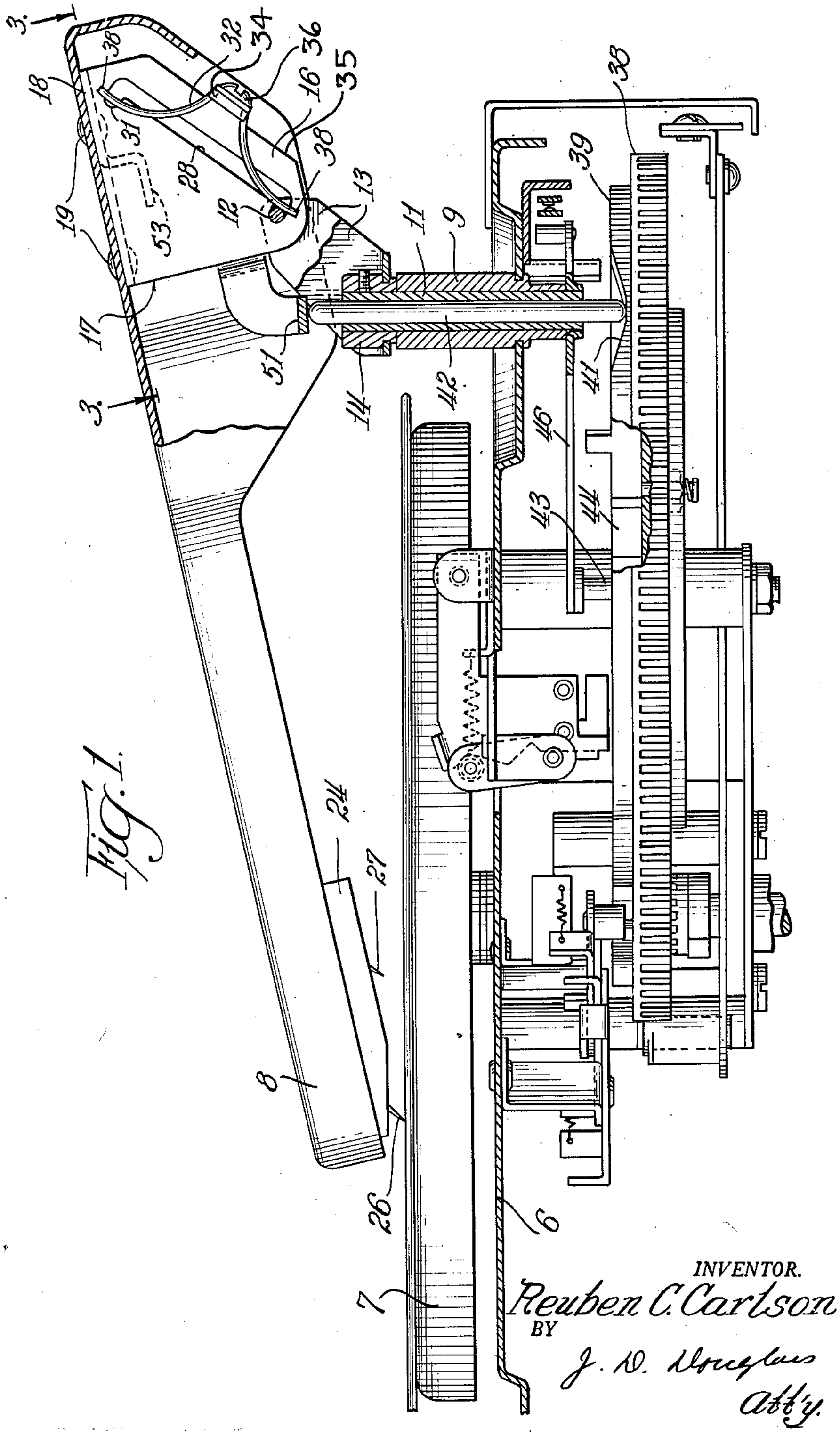
Fig. 1 is a view of the invention in side elevation, parts of the mechanism being broken away to reveal the structure of underlying parts.
Figure 2:
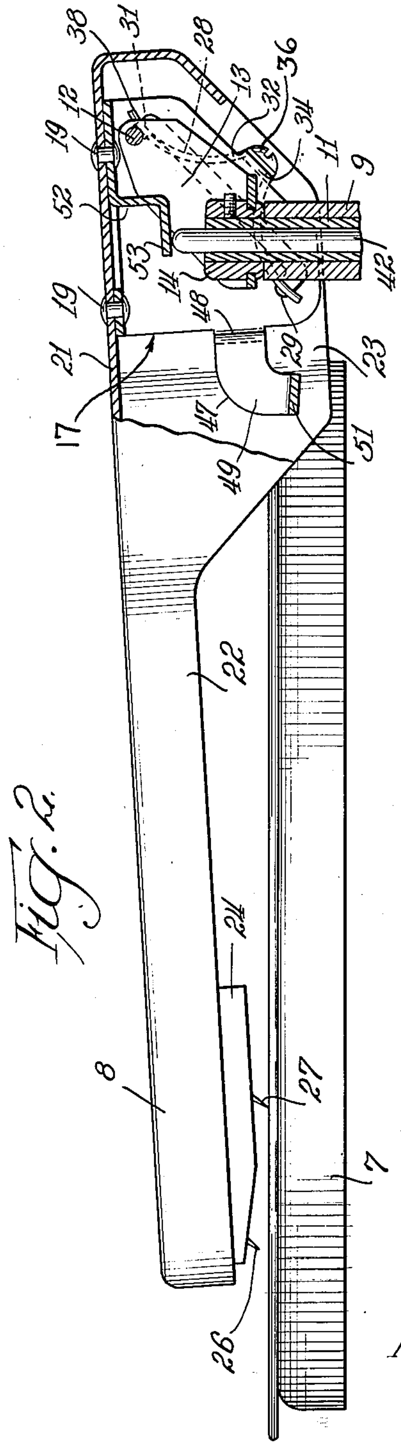
Fig. 2 is another view corresponding to Fig. 1, the parts being broken away to a greater extent and shown in a different position.

In Fig. 1, wherein for the purpose of illustration, is shown one embodiment of the invention, the reference character 6 is used to denote a frame or housing for a phonograph automatic record player on which is rotatably mounted a conventional turntable 7 over which a pickup arm 8 is adapted to swing.

Figure 4:
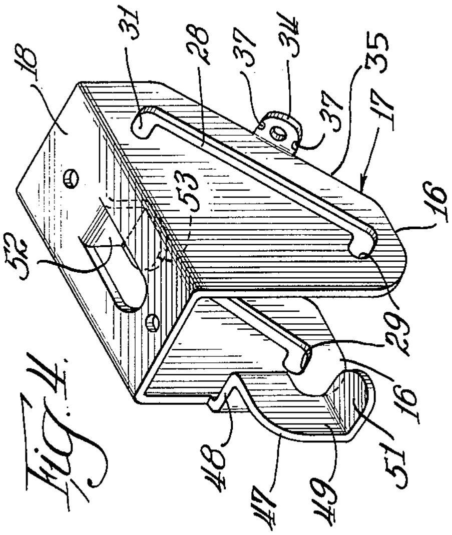
Fig. 4 is a perspective view showing the saddle member.
Figure 3:
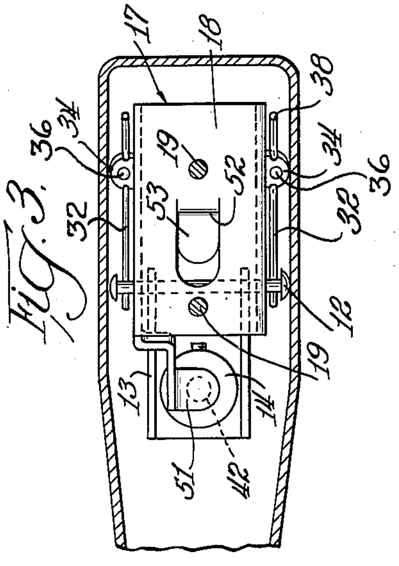
Fig. 3 is a section taken on line 3—3 of Fig. 1.

Support for the pickup arm 8 includes a vertical, tubular post 9 rigidly attached to the frame 6 in any convenient manner. The support also includes a sleeve 11, journalled in the post, in order that the pickup arm may be swung about a vertical axis. Laterally of the axis of sleeve 11, a horizontal shaft or pin 12 is supported at the ends of a pair of arms 13 extending upwardly from a collar 14 which is rigidly coupled to the sleeve 11, the collar resting on post 9 and thereby serving to resist downward displacement of sleeve 11. The pickup arm 8, on the other hand, includes, for connection with the pin 12, a pair of arms 16 extending downwardly therefrom. The arms 16 may be integral parts of the pickup arm 8 or may, preferably for the sake of convenience in manufacture, be integral parts of a metal stamping indicated in its entirety by the character 17 (Fig. 4) and hereinafter referred to as a saddle or intermediate member, which includes a central or top wall 18. Any convenient means may be employed to rigidly connect the saddle to the pickup arm, the particular means disclosed involving rivets 19 passing through the wall 18 and an upper wall 21 of the pickup arm. Adjacent the saddle, side walls 22 of the pickup arm extend downwardly sufficiently at 23 to obscure the saddle from view and also to shield other parts, later to be described, from injury by the hand of an attendant.

For operatively engaging both microgroove records and conventional records, the pickup arm 7 bears, at its outer end, a transducer 24 having, extending downwardly therefrom, a needle 26 adapted to operatively engage microgroove or long playing records, and a needle 27 adapted to operatively engage records of the conventional groove variety. The needles 26 and 27 are spaced from each other, longitudinally of the pickup arm 8, by a distance to be explained hereinafter. Also, it will be noted that the record-engageable ends of the needles 26 and 27 are in different planes with respect to the lower side of the pickup arm 8. It therefore follows that means must be provided to elevate and/or lower the inner end of the pickup arm in order to alternately bring into operative position the appropriate one of the needles for engagement with a record of the class it is desired to reproduce.

A novel connection is therefore provided between the arms 16 and the pin 12. It involves an obliquely extending straight slot 28, in each of the arms 16, adapted to accommodate the pin 12. At both of their lower ends, the slots 28 extend abruptly laterally and in an upward direction to provide, a pair of sockets or stirrups 29, while at the upper ends the slots 28 also extend abruptly laterally and in an upward direction to provide stirrups 31 similar to the stirrups 29. Each of the pairs of sockets 29 and 31 is adapted to be in bearing relationship with the pin 12 by which the pickup arm is adapted to be rocked about a horizontal axis. By grasping the outer or pivoted end of the pickup arm, lifting it slightly so that the slot 28 is enabled to be moved over the pin 12, the pivotal support of the pickup arm is adapted to be shifted from one to the other of the pairs of sockets 29 and 31. Additionally, the sockets 29 and 31 are spaced, longitudinally of the length of the pickup arm, from each other by a distance equal to the space between the needles 26 and 27. This provides for engagement of a record on the turntable, by either of the needles at the same distance from the axis of post 9.

If desired, means may be provided for removably retaining the pin 12 in engagement with either of the pairs of sockets 29 or 31. Said means include springs 32, preferably of resilient wire. In order that the springs 32 may be supported, a lug 34 is struck outwardly from edges 35, parallel to the slots 28, on each of the arms 17 while centrally thereof both of the springs 32 are looped about screws 36, threaded in the lugs, between the heads thereof and the lugs 34. The springs extend upwardly through notches 37 in opposite edges of each of the lugs, thence diverge to free ends 38 one of which is beside each of the sockets 29 and 31. When the support of pickup arm 8 is shifted from one to the other of the sockets one of the arms of each of the springs is deflected, by the pin 12, the pin being thus pressed into engagement with the sockets.

Provision is made for automatically manipulating the pickup arm 8 regardless of whether the pin 12 is engaged by the sockets 29 or sockets 31. For this purpose, the housing 6 therefore contains mechanism which will not be described in detail since it forms the subject matter of my copending application, Serial Number 41,388, filed on July 29, 1948. In view of this, it is timely to state that the mechanism includes a cyclically-operated cam wheel 38 on which a lift cam 39, having a dwell portion 41 is disposed.

During the process of reproducing a record, of either class, a lift rod, slidably journalled in the sleeve 11, rests in the dwell 41. Also, a follower 43, cooperatively associated with a lateral motion cam 44 on the wheel 38, is rigidly coupled to the lower end of sleeve 11 by an arm 46 for swinging the pickup arm about its vertical axis when a record is rejected. From one of the arms 16, of the saddle 17, a contactor arm 47 extends laterally and inwardly as at 48 (Fig. 4) thence downwardly as at 49 from which in lateral extension therefrom is a contactor finger 51 adapted to be engaged by the lift rod 42 when a microgrooved record is rejected. From the top wall 18, of the saddle 17, an arm 52 is struck downwardly and includes a second laterally protruding contactor finger 53 adapted to be engaged by the lift rod 42 when the pin 12 is in engagement with socket 31 and a standard grooved record is rejected.

Owing to my invention, as will now be apparent, I have provided a novel yet simple device, due to which I am able to equip a pickup arm with two needles one of which is adapted to operatively engage microgroove records and the other standard grooved records. This I am now able to do so that when one needle is extended for engagement with one of the two classes of records, the other needle is withdrawn from a position of possible engagement with a record while at one and the same time that one of the needles is extended the center of gravity of the pickup arm is shifted with respect to its pivotal support so that the pressure with which the extended needle is adapted to engage a record, due to the weight of the pickup arm, is automatically in accordance with the needle so extended. Thus, the weight with which the needle engages the records is changed, being less for the slow playing first groove record than for the standard part playing record. This difference in weight may be further accentuated by adding weight to the base end of the pickup arm, which may be readily effected by thickening the end wall if desired.

Having thus described my invention in an embodiment thereof, I am aware that numerous and extensive departures may be made therefrom without departing from the spirit or scope of my invention.

I claim:

1. The combination with a pickup arm member including transducer means having two needles in connection therewith and means including a support member by which the pickup arm is carried, of pintles on a horizontal axis in connection with one of said members, bearing means in connection with the other of said members providing a first, and a second pair of sockets adapted to be severally positioned in bearing engagement with said pintles, resilient means in connection with one of said members to removably retain either of said sockets in engagement with said pintles, guide means between said sockets provided by said bearing means, said guide means being adapted to alternately guide either of said pairs of sockets into engagement with said pintles when one of the members is shifted manually thereby providing for pivotal support of the pickup arm at either of two different positions.

2. Apparatus of the class described comprising a pickup arm including transducer means having in connection therewith two needles to severally engage either of two classes of phonograph records, means including a support member by which the pickup arm is carried, pintles on a horizontal axis carried by the support member, a pair of arms extending from said pickup arm to points adjacent said support member, two pairs of bearing sockets at different horizontal levels on said arms, each of said pair of sockets being adapted to be severally engaged by said pintles to provide pivotal axes at different distances from the center of gravity of said pickup arm, guide surfaces in connection with said arms and adapted to engage said pintles when the pickup arm is manually moved out of engagement with one of the pairs of sockets, said guide surfaces then serving to guide the other of the pair of sockets into bearing engagement with said pintles, and spring means in connection with said arms to releasably retain either of said pair of sockets in engagement with said pintles.

3. The combination with a pickup arm member and a carrier member for support of the pickup arm member and a pair of horizontal coaxial pintles in connection with one of the members, of transducer means in connection with the pickup arm member, a first needle in connection with said transducer means for operative engagement with a record of one class, a second needle in connection with said transducer means for engagement with a record of another class, a pair of arms on one of said members, each of said arms being formed with a slot therethrough, said slots sloping upward obliquely to said pickup arm and adapted to receive said pintles, a pair of spaced-apart sockets opening off each of said slots, said pickup arm being adapted to be manually moved to provide engagement of said pintles by one or the other of said sockets to position one or the other of said needles for engagement with a record.

4. Pickup apparatus for a record player comprising a pickup arm member, mechanism including a fixed bearing and a carrier member in association with said bearing to provide for rotation of the arm member about a vertical axis, a pair of needles extending from said arm member to different planes with respect to the lower side thereof, each of said needles being adapted to severally engage fine and coarse sound groove records by varying the elevation of the support for said arm member by means including an intermediate element rigidly coupled to one of said members, pintles on the other of said members, spaced-apart pairs of sockets on said element adapted to be alternately moved into engagement with said pintles to provide alternate horizontal axes for said pickup arm, one of said pair of sockets being at a higher level than the other pair of sockets to alternately position said pickup arm so that both of said needles is adapted to severally engage a record.

5. Reproducer apparatus for a record player comprising a pickup arm member, mechanism including a fixed bearing and a carrier member in association with said bearing to provide for rotation of the arm member about a vertical axis, a pair of spaced-apart needles extending from said arm member to different planes with respect to the lower side thereof, said needles being adapted to engage fine or coarse grooved records alternately by varying the elevation of the support for said arm member and simultaneously shifting the center of gravity of said arm member with respect to the pivotal support therefor by means including an intermediate element rigidly coupled to one of said members, pintles on the other of said members, guide surfaces on said element oblique to said pickup arm, spaced-apart sockets in communication with said guide surfaces, said pintles being adapted to be severally in engagement with said sockets to provide two alternate pivotal axes for said arm member, said guide surfaces providing for association of said members with each other while pivotal support for said pickup arm member is being shifted from one to the other of said sockets, and spring means rigidly coupled to said element to yieldably resist disassociation of the pintles and either of the sockets from each other.

6. A mounting member for a phonograph pickup arm comprising a center portion adapted to be attached to the pickup arm, arm portions extending downwardly from said center portion, said arms being formed with slots therethrough, said slots sloping upwardly obliquely to said pickup arm from a lower bearing portion to an upper bearing portion.

7. A mounting member for a phonograph pickup arm comprising a center portion adapted to be attached to the pickup arm, arm portions extending downwardly from said center portion, said arms being formed with slots therethrough, said slots sloping upwardly obliquely to said pickup arm from a lower bearing portion to an upper bearing portion, said lower and upper bearing portions being formed as lateral sockets at the ends of said slots.

8. In an automatic phonograph having operating means including a vertically effective cam, in combination, a pickup arm member, a transducer carried by said arm member, a pair of needles, one needle being formed for engagement with one class of records, and the other of said needles being formed for engagement with another class of records, a carrier member rotatably mounted on said phonograph, journal means carried by one of said members formed with journal surfaces, spaced apart bearing means formed in the other of said members, said journal means being engaged with and shiftable between said bearing means to shift one of said needles into engagement position and the other out of engagement position, a lift rod adapted to be moved vertically by said cam, a first contactor member on said arm member in position to be engaged by said rod in one position of said journal means, second contactor member on said arm member in position to be engaged by said rod in the other position of said journal means, said rod being effective to rock said pickup arm member vertically by such engagement.

9. In a record player having a base plate, in combination, a fixed bearing mounted on said base plate, a bifurcated member journalled in said bearing, a pickup arm, flanges extending downwardly from said pickup arm beside said bifurcated member, said flanges each being formed with upper and lower bearing notches, said notches being laterally and vertically spaced apart, pintles carried by said bifurcated member adapted to engage said bearing notches alternately, slots formed in said flanges between said notches to guide said pintles therebetween, a transducer carried by said arm, a first needle on said transducer extending below said arm, a second needle on said transducer extending a greater distance below said arm, said needles being formed for engagement with alternate classes of records, the extension of said needles from said arm being such as to cause a shifting of engagement from one needle to the other upon shifting of said bearing notches.

10. In an automatic record player having a base plate and changer operating means disposed beneath said base plate, in combination, a fixed bearing mounted on said base plate, a bifurcated member journalled in said bearing, a pickup arm, flanges extending downwardly from said pickup arm beside said bifurcated member, said flanges each being formed with upper and lower bearing notches, said notches being laterally and vertically spaced apart, pintles carried by said bifurcated member adapted to engage said bearing notches alternately, slots formed in said flanges between said notches to guide said pintles therebetween, a transducer carried by said arm, a first needle on said transducer extending below said arm, a second needle on said transducer extending a greater distance below said arm, said needles being formed for engagement with alternate classes of records, the extension of said needles from said arm being such as to cause a shifting of engagement from one needle to the other upon shifting of said bearing notches, a lift rod slidably journalled longitudinally of said bifurcated member, a first contactor member on said pickup arm in position to be engaged by said rod when said pintles engage the first of said bearing notches, and a second contactor means on said pickup arm in position to be engaged by said rod when said pintles engage the other of said notches.

REUBEN C. CARLSON.

REFERENCES CITED

The following references are of record in the file of this patent:

UNITED STATES PATENTS

| Number | Name | Date |
|---|---|---|
| 467,530 | White | Jan. 26, 1892 |
| 630,521 | Schoenner | Aug. 8, 1899 |
| 1,231,435 | Schiff | June 26, 1917 |
| 1,243,853 | Matson | Oct. 23, 1917 |
| 2,113,401 | Goldsmith | Apr. 5, 1938 |
| 2,239,359 | Banning | Apr. 22, 1941 |
| 2,294,575 | Schneider | Sept. 1, 1942 |
| 2,326,625 | DiToro | Aug. 10, 1943 |
| 2,375,658 | Johnson | May 8, 1945 |